(12) United States Patent
Krishnamurthi

(10) Patent No.: US 7,146,149 B1
(45) Date of Patent: Dec. 5, 2006

(54) HIGH ISOLATION SWITCH BUFFER FOR FREQUENCY HOPPING RADIOS

(75) Inventor: Kathiravan Krishnamurthi, Westford, MA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 469 days.

(21) Appl. No.: 10/617,469

(22) Filed: Jul. 10, 2003

(51) Int. Cl.
H04B 1/26 (2006.01)

(52) U.S. Cl. .................. 455/318; 455/319; 455/118; 455/255; 331/2; 331/8; 331/30

(58) Field of Classification Search ............. 455/318, 455/118, 319, 323, 324–326, 333, 334, 550.1, 455/575.1, 561, 424, 425, 456.5, 456.6, 501, 455/63.1, 95, 570, 114.2, 114.1, 161.2, 119, 455/189.1, 147, 209, 255, 256, 285, 296, 455/315, 313, 317; 375/306, 307; 327/100, 327/124, 127, 264, 266, 274, 484; 331/2, 331/7, 8, 30, 34, 46, 49; 342/18, 14, 100; 702/126

See application file for complete search history.

(56) References Cited

U.S. PATENT DOCUMENTS

| | | | | | |
|---|---|---|---|---|---|
| 4,006,353 | A | * | 2/1977 | Pierce | 708/835 |
| 5,231,632 | A | * | 7/1993 | Yamao et al. | 370/331 |
| 5,309,479 | A | * | 5/1994 | Cheah | 375/303 |
| 5,574,755 | A | * | 11/1996 | Persico | 375/295 |
| 5,898,913 | A | * | 4/1999 | Pengelly et al. | 455/321 |
| 5,917,854 | A | * | 6/1999 | Taylor et al. | 375/222 |
| 5,960,334 | A | * | 9/1999 | Nakano | 455/188.1 |
| 6,163,222 | A | * | 12/2000 | Kobayashi | 330/302 |
| 6,211,718 | B1 | * | 4/2001 | Souetinov | 327/359 |
| 6,654,595 | B1 | * | 11/2003 | Dexter | 455/323 |
| 6,904,266 | B1 | * | 6/2005 | Jin et al. | 455/20 |
| 6,952,572 | B1 | * | 10/2005 | Wong et al. | 455/318 |
| 6,973,188 | B1 | * | 12/2005 | Seitner | 380/38 |
| 2004/0002320 | A1 | * | 1/2004 | Lin | 455/318 |
| 2004/0056726 | A1 | * | 3/2004 | Dvorak | 331/46 |

* cited by examiner

Primary Examiner—Edward F. Urban
Assistant Examiner—Charles Chow
(74) Attorney, Agent, or Firm—Blakely, Sokoloff, Taylor & Zafman LLP

(57) ABSTRACT

A local oscillator (LO) circuit is disclosed which provides improved isolation between the unselected LO source and a mixer. The LO circuit includes a first LO source to generate a first periodic signal cycling at a first frequency, a second LO source to generate a second periodic signal cycling at a second frequency different than the first frequency, a limiter, a first switching element to selectively couple the first LO source to the limiter, and a second switching element to selectively couple the second LO source to the limiter. The limiter improves the isolation of the leakage LO signal (i.e. the unselected LO signal) with respect to the selected LO signal. The improved isolation comes about because the limiter gain associated with the selected LO signal is greater than the gain associated with the leakage LO signal. A receiver and transmitter using the LO circuit are also disclosed.

19 Claims, 6 Drawing Sheets

HIGH ISOLATION SWITCH BUFFER FOR FREQUENCY HOPPING RADIOS

FIELD OF THE INVENTION

This invention relates generally to radio frequency (RF) receivers and transmitters, and in particular, to a frequency hopping RF transmitter and receiver which includes a limiter to provide improved isolation between a unselected local oscillator (LO) and a mixer.

BACKGROUND OF THE INVENTION

Frequency hopping receivers typically include a mixer selectively coupled to one of a plurality of local oscillators (LOs) producing LO signals cycling at different frequencies to down convert a frequency-moving RF signal. For instance, in a two-LO frequency hopping receiver, at a particular time the first LO is coupled to the mixer to down convert the received RF signal, while the second LO is de-coupled from the mixer. At another particular time, the first LO is de-coupled from the mixer, while the second LO is coupled to the mixer to down convert the received RF signal. To reduce interference in the down conversion of the received RF signal, it is desirable that there be no leakage of the LO signal generated by the unselected LO to the mixer. This concept is further explained in more detail with reference to an exemplary prior art receiver.

FIG. 1 illustrates a block diagram of a prior art frequency-hopping receiver 100. The prior art receiver 100 consists of a low noise amplifier (LNA) 102, an image-reject filter 103, a mixer 104, an intermediate frequency (IF) filter 106, and an IF amplifier 108. In addition, the prior art receiver 100 consists of an LO circuit having first LO source 110, a second LO source 112, a first set of switching devices 114 and 115 in the form of field effect transistors (FETs), a second set of switching devices 116 and 117 also in the form of FETs, and a pair of 50-ohm loads.

The LNA 102 amplifies the received RF signal. The image-reject filter 103 further reject (i.e. suppresses) the image signal with respect to the desired signal. The mixer 104 mixes the RF signal with an LO signal generated by either one of the LO sources 110 (which generate LO signals cycling at different frequencies) to down convert the received RF signal to an IF signal. The IF filter 106 removes undesirable signals from the IF signal. And, the IF amplifier 108 amplifies the IF signal.

In receiving a frequency-hopping RF signal, the first and second sets of switches 114–115 and 116–117 are operated to alternate the coupling of the LO sources 110 and 112 to the mixer 104. More specifically, at a particular time the FET 114 is turned on to couple the first LO source 110 to the mixer 104 and the FET 115 is turned off to de-couple the LO source 110 from the 50-ohm load. At the same time, the FET 116 is turned off to de-couple the second LO source 112 from the mixer 104 and the FET 117 is turned on to couple the LO source 112 to the 50-ohm load. At another time, the FET 114 is turned off to de-couple the first LO source 110 from the mixer 104 and the FET 115 is turned on to couple the LO Source 110 to the 50-ohm load. At the same time, the FET 116 is turned on to couple the second LO source 112 to the mixer 104 and the FET 117 is turned off to de-couple the LO source 112 from the 50-ohm load.

A problem with the prior art receiver 100 is that the first and second sets of FETs 114–115 and 116–117 are not perfect in isolating the unselected LO source from the mixer. That is, when the FET 114 is turned on and FET 115 is turned off in order to couple the first LO source 110 to the mixer 104, and the FET 116 is turned off and the FET 117 is turned on in order to de-couple the second LO source 112 from the mixer 104, there is still some leakage of the second LO signal across the FET 116. Conversely, when the FET 114 is turned off and FET 115 is turned on in order to de-couple the first LO source 110 from the mixer 104, and the FET 116 is turned on and FET 117 is turned off in order to couple the second LO source 112 to the mixer 104, again there is some leakage of the first LO signal across the FET 114. This leakage LO signal combines with the desired LO signal at the input to the mixer 104, and thus causes interference in the down conversion of the received RF signal.

Thus, there is a need to improve the isolation between the unselected LO source and the mixer. Such need and others are met with an improved LO circuit in accordance with the invention.

SUMMARY OF THE INVENTION

A first aspect of the invention relates to a local oscillator (LO) circuit comprising a first LO source to generate a first periodic signal cycling at a first frequency, a second LO source to generate a second periodic signal cycling at a second frequency different than the first frequency, a limiter, a first switching element to selectively couple the first LO source to the limiter, and a second switching element to selectively couple the second LO source to the limiter. The limiter improves the isolation of the leakage LO signal (i.e. the unselected LO signal) with respect to the selected LO signal. The improved isolation comes about because the limiter gain associated with the selected LO signal is greater than the gain associated with the leakage LO signal.

In a more specific embodiment, the first and second switching elements each comprises a transistor, which may be a field effect transistor or other type of transistor. The LO circuit may further comprise a transformer coupled between the limiter and the first and second switching elements. The transformer generates first and second differential transformer outputs.

The limiter may comprise a first differential transistor having a first conduction path and a first control input to control a resistance of the first conduction path, wherein the first control input is coupled to the first differential transformer output; a second differential transistor having a second conduction path and a second control input to control a resistance of the second conduction path, wherein the second control input is coupled to the second differential transformer output; a first resistive element coupled between the first conduction path and a power supply terminal; a second resistive element coupled between the second conduction path and the power supply terminal; and a current source coupled between the first and second conduction paths and a ground terminal. The first and second differential transistors may comprise bipolar transistors.

Another aspect of the invention relates to a method for providing improved isolation between the unselected LO source and the mixer. The method comprises generating a first LO signal cycling at a first frequency; generating a second LO signal cycling at a second frequency different than the first frequency; activating a first switching element to substantially produce the first LO signal at a node; de-activating a second switching element to substantially de-couple the second LO signal from the node, wherein a leakage LO signal is also produced at the node; amplifying the first LO signal and the leakage LO signal at the node, wherein a gain associated with the first LO signal is greater than a gain associated with the leakage LO signal.

In addition, other aspects of the invention relate to a receiver and transmitter that uses the improved LO circuit. Other aspects, features and techniques of the invention will become apparent to one skilled in the relevant art in view of the following detailed description of the invention.

DETAILED DESCRIPTION OF THE INVENTION

Figure 1:
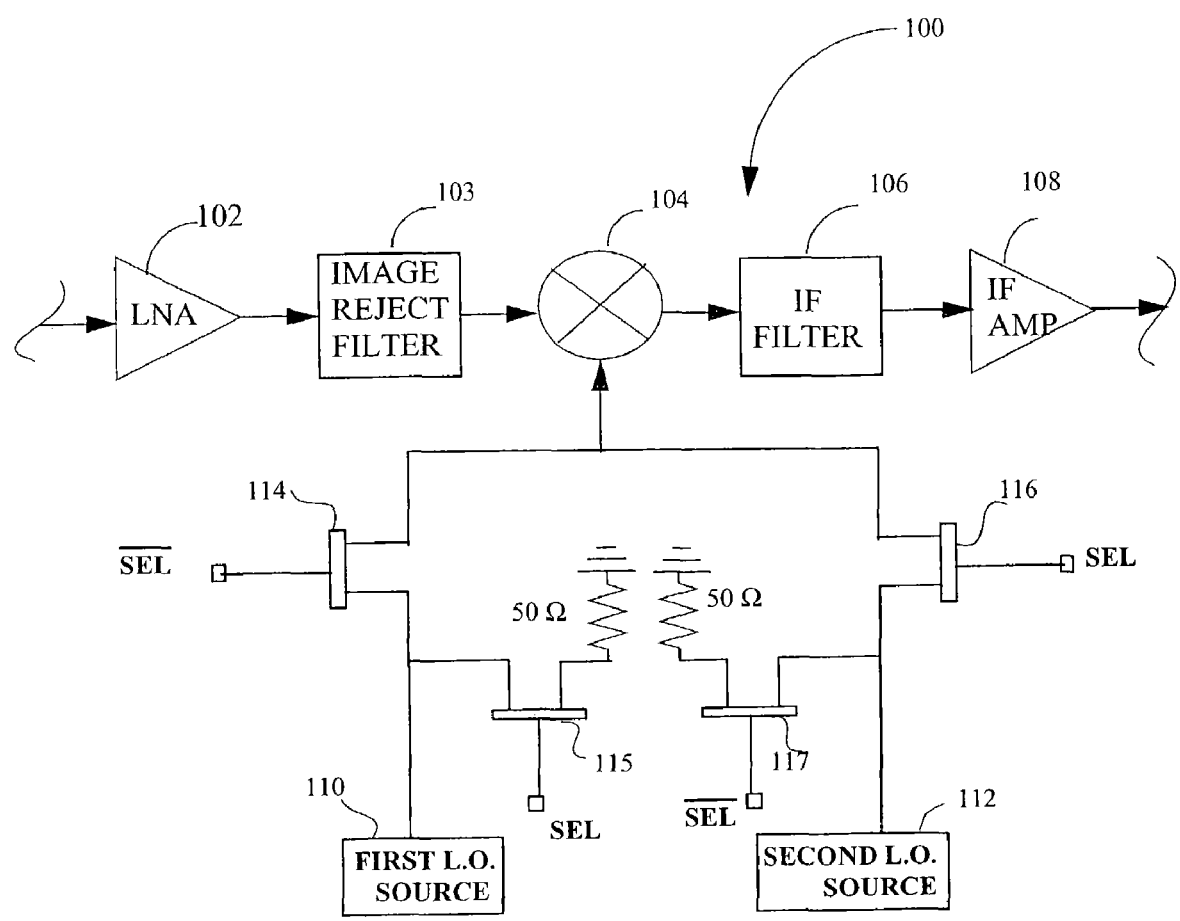
FIG. 1 illustrates a block diagram of a prior art frequency-hopping receiver.
Figure 2:
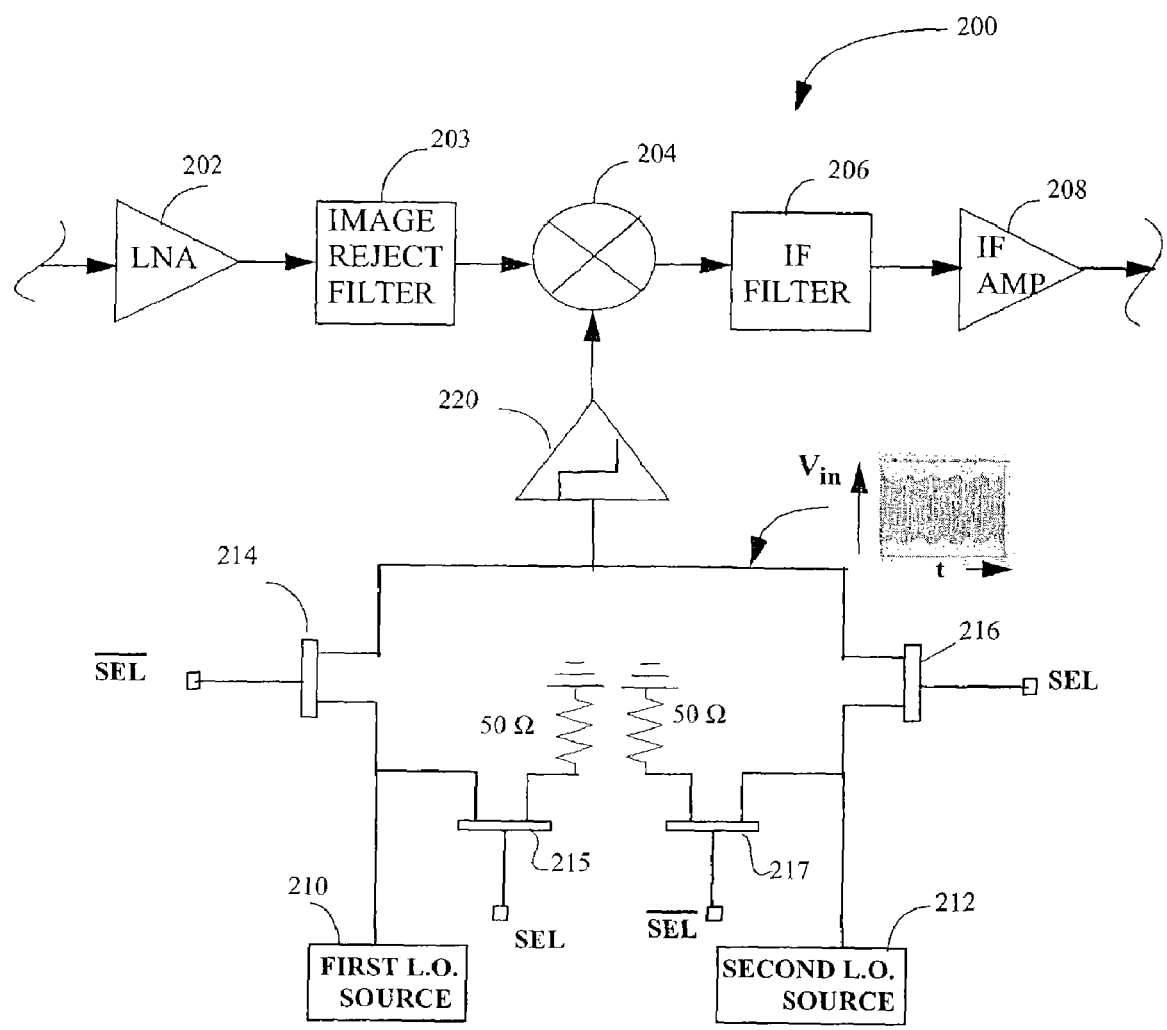
FIG. 2 illustrates a block diagram of an exemplary frequency-hopping receiver in accordance with an embodiment of the invention.

FIG. 2 illustrates a block diagram of an exemplary frequency-hopping receiver 200 in accordance with an embodiment of the invention. The frequency-hopping receiver 200 comprises a low noise amplifier (LNA) 202, an image-reject filter 203, a mixer 204, an intermediate frequency (IF) filter 206, and an IF amplifier 208. In addition, the frequency-hopping receiver 200 further comprises an LO circuit having a first local oscillator (LO) source 210, a second LO source 212, a first set of switching elements 214–215, a second set of switching elements 216–217, a pair of 50-ohm loads, and a limiter 220.

A received RF signal is directed to the input of the LNA 202 which amplifies the received RF signal. The image-reject filter 203, being coupled to the output of the LNA 202, rejects (i.e. suppresses) the image signal with respect to the desired signal in the received RF signal. An input of the mixer 204, being coupled to the output of the image-reject filter 203, receives the amplified and filtered RF signal.

The first LO source 210 generates a first LO signal cycling with a first frequency. The second LO source 212 generates a second LO signal cycling with a second frequency that is different than the first frequency. The first and second sets of switching elements 214–215 and 216–217 selectively couple one of the LO sources 210 and 212 to the input of the limiter 220, and selectively de-couple the other of the LO sources 210 and 212 from the input of the limiter 220. In this example, the first and second sets of switching elements 214–215 and 216–217 are field effect transistors (FETs), but other switching devices can also be used, such as p-i-n diodes.

As will be discussed in more detail later, the limiter 220 provides further isolation of the leakage LO signal with respect to the selected LO signal. The output of the limiter 220 is coupled to a second input of the mixer 204. The mixer 204 mixes the amplified and filtered RF signal with the selected LO signal to down convert the RF signal into an IF signal. The IF filter 206, being coupled to the output of the mixer 204, removes undesired signals from the IF signal generated by the mixer 204. The IF amplifier 208, being coupled to the output of the IF filter 206, amplifies the IF signal.

As discussed in the Background section, a source of interference in frequency-hopping receivers is the leakage of the unselected LO signal from the corresponding LO source to the mixer. That is, when switching element 214 is turned on and switching element 215 is turned off to couple the first LO source 210 to the mixer 204, and switching element 216 is turned off and switching element 217 is turned on to de-couple the second LO source 212 from the mixer 204, there is still some leakage of the second LO signal across the switching element 216 (e.g. the leakage signal may be approximately 30 dB below the selected LO signal). Conversely, when switching device 214 is turned off and switching element 215 is turned on to de-couple the first LO source 210 from the mixer 204, and switching element 216 is turned on and switching element is turned off to couple the second LO source 212 to the mixer 204, again there is some leakage of the first LO signal across the first switching element FET 214. This leakage LO signal combines with the selected LO signal at the input to the mixer 204, and thus causes interference in the down conversion of the received RF signal.

However, in the exemplary frequency-hopping receiver 200 in accordance with the invention, the limiter 220 provided between the switching elements 214 and 216 and the mixer 204 further suppresses the leakage LO signal with respect to the selected LO signal. The reason for the suppression of the leakage LO signal is that the limiter 220 provides a larger gain for relatively large-amplitude signals cycling at a first frequency and a smaller gain for relatively small-amplitude signals cycling at a second frequency different than the first frequency. This concept will be explained with reference to the graphs depicted in FIGS. 3A–B.

Figure 3A:
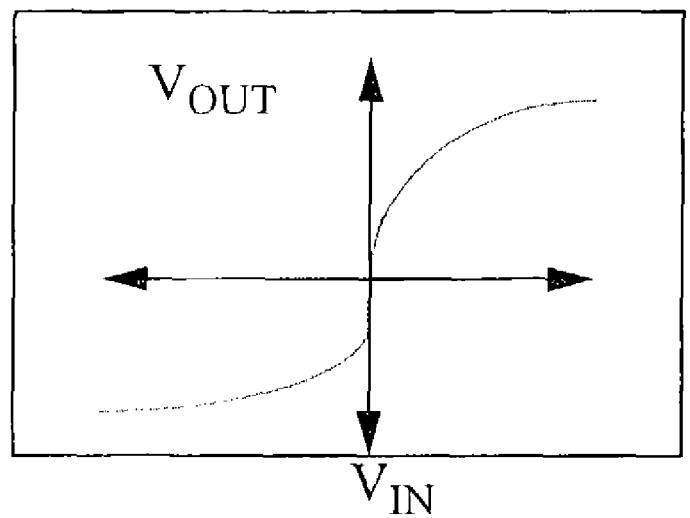
FIG. 3A illustrates a graph of an exemplary output voltage versus input voltage plot for the limiter.

FIG. 3A illustrates a graph of an exemplary output voltage Vout versus input voltage $V_{IN}$ plot for the limiter 220. As the graph illustrates, the small signal gain centered at the input voltage $V_{IN}$ being zero (0) is relatively large, indicated by the high slope of the curve near $V_{IN}$=0. At higher input voltage $V_{IN}$ levels, the gain reduces as indicated by the ever decreasing slope of the curve. At the input of the limiter 220, the LO leakage signal, being much lower amplitude and cycling at a different frequency than the selected LO signal, rides on the envelope of the selected LO signal. In other words, the amplitude of the selected LO signal is modulated by the LO leakage signal, as shown in FIG. 3C. Since the LO leakage signal rides on the peaks of the selected LO signal, its gain is relatively small since the limiter 220 is in compression at relatively high input voltages. Whereas the selected LO signal, which cycles about $V_{IN}$=0, has a relatively high gain because the limiter 220 is operating in a more linear region. This concept may be further explained with reference to FIG. 3B.

Figure 3B:
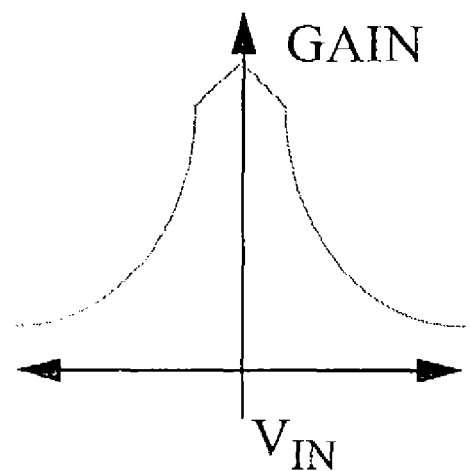
FIG. 3B illustrates a graph of an exemplary gain plot for the limiter.
Figure 3C:
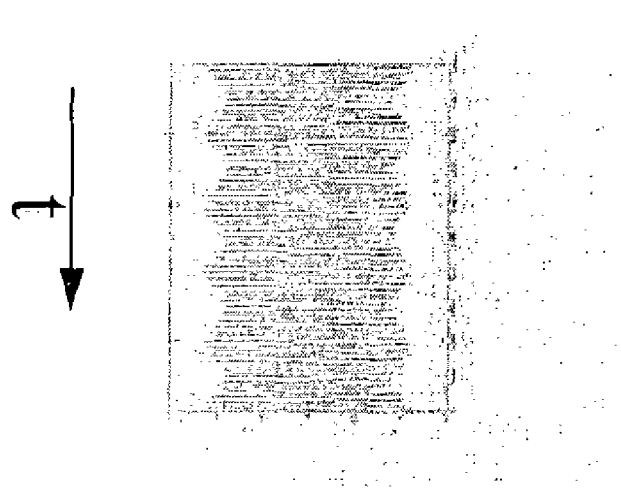
FIG. 3C illustrates a graph of the time-domain variation of the LO signal at the input of the limiter.

FIG. 3B illustrates a graph of an exemplary gain plot for the limiter 220. As the graph illustrates, the gain provided by the limiter 220 is maximum at an input signal cycling about zero Volt. If the input signal above or below zero Volt, the gain provided by the limiter 220 is substantially reduced. Since the selected LO signal cycles about zero Volt, the gain provided by the limiter 220 is relatively high. However, for the LO leakage signal, which rides on the envelope of the selected LO signal, the gain provided by the limiter 220 is relatively small. The difference in gain associated with the selected LO signal and the leakage LO signal provides further isolation between the unselected LO source and the mixer. This concept will now be illustrated mathematically with reference to a more specific embodiment of the receiver described below.

Figure 4:
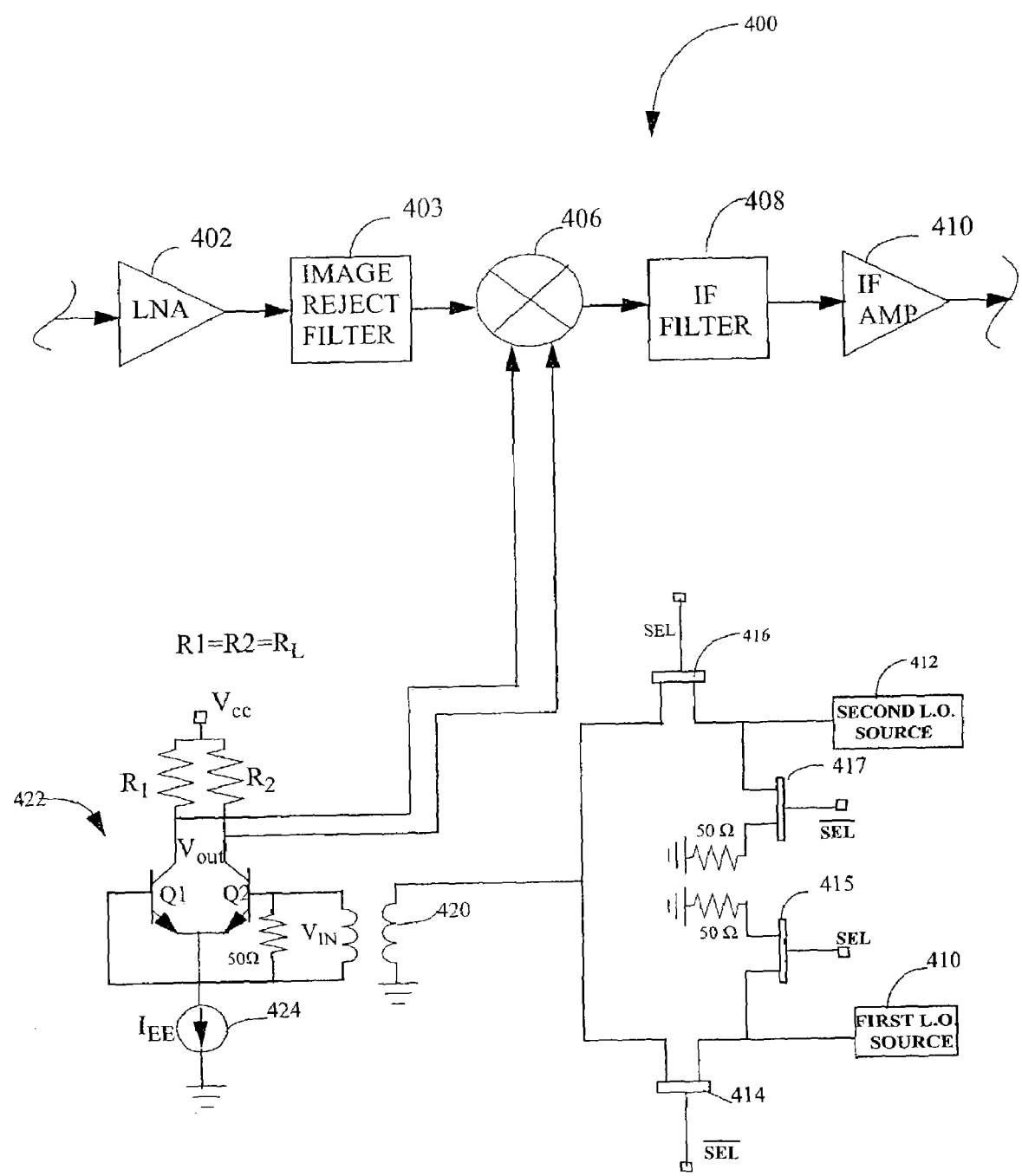
FIG. 4 illustrates a block diagram of another exemplary frequency-hopping receiver in accordance with another embodiment of the invention.

FIG. 4 illustrates a block diagram of another exemplary frequency-hopping receiver 400 in accordance with another embodiment of the invention. The receiver 400 comprises an LNA 402 to amplify the received RF signal, an image reject filter 403 to reject the image signal, a mixer 406 to down convert the received RF signal into an IF signal, an IF filter 408 to reject undesired signals generated by the mixer 406, and an IF amplifier 410 to amplify the IF signal. In addition, the receiver 400 comprises an LO circuit comprising a first LO source 410 to generate a first periodic signal cycling at a first frequency, a second LO source 412 to generate a second periodic signal cycling at a second frequency different then the first frequency, a first set of switching elements 414–415 (e.g. FETs) to selectively couple and de-couple the first LO source 410 to and from the mixer 406, a second set of switching elements 416–417 (e.g. FETs) to selectively de-couple and couple the second LO source 412 from and to the mixer 406. The first and second sets of switches couple the unselected LO source to the corresponding 50-ohm load.

The LO circuit further comprises a transformer 420, coupled to both switching elements 414 and 416, to convert the LO signal into a differential LO signal. In addition, the LO circuit comprises a limiter 422 including a differential pair of transistors Q1 and Q2 (e.g. bipolar transistors), a pair of resistive elements R1 and R2 coupled between the respective collectors of the transistors Q1 and Q2 and a power supply Vcc, and a current source 424 coupled between the emitters of the transistors Q1 and Q2 and ground terminal. A 50-ohm resistive element is coupled across the secondary winding of the transformer 420. The differential outputs of the limiter 422 are taken off the respective collectors of the transistors Q1 and Q2. The differential ouptuts of the limiter 422 may be applied to the mixer 406 if it accepts differential LO inputs, or may be converted back to a single-ended output with the use of another transformer (not shown). The limiter 422 provides higher gain for the selected LO signal than for the leakage LO signal, thereby further improving the isolation of the leakage LO signal between the unselected LO source and the mixer 406. This characteristic of the LO circuit is mathematically shown as follows.

Mathematically, the selected LO signal may be represented as $V \sin(\omega t)$ and the leakage LO signal may be represented as $m \sin(\omega+\Delta\omega)t$, where V is the amplitude of the selected LO signal at the input of the limiter 422, m is the amplitude of the leakage LO signal at the input to the limiter 422, $\omega$ is the frequency of the selected LO signal, and $\Delta\omega$ is the difference in frequency between the selected LO signal and the leakage LO signal. Accordingly, the total signal y at the input of the limiter 422 may be represented as:

$$y = V \sin(\omega t) + m \sin(\omega+\Delta\omega)t \qquad \text{Equation 1}$$

Using trigonometric identities, the total signal y may be represented as:

$$y = V \sin(\omega t) + m \sin \omega t \cos \Delta\omega t + m \sin \Delta\omega t \cos \omega t \qquad \text{Equation 2}$$

Assuming that the difference in frequency $\Delta\omega$ between the selected LO signal and the leakage LO signal is very small as compared to the frequency ($\omega$ of the selected LO signal (i.e. $\Delta\omega<<\omega$), then the term $\sin \Delta\omega t$ may be approximated as being zero (0). Thus, the total signal y may be approximated as:

$$y \approx (V+m \cos \omega t) \sin \omega t \qquad \text{Equation 3}$$

As Equation 3 illustrates, the total signal y may be viewed as a large signal $V \sin \omega t$ being amplitude modulated by a small signal $m \cos \Delta\omega t$ (see FIG. 3C). Because the small signal amplitude modulates the larger signal, the small signal excursion occurs around the skirts of the gain function of the limiter 422 shown in FIG. 3B. However, the excursion of the large signal occurs around the center of the gain function of the limiter 422. Thus, the gain associated with the large signal gain is substantially greater than the gain associated with the small signal.

Mathematically, the transfer function of the differential transistor pair Q1 and Q2 of the limiter 422 may be represented as:

$$\Delta I_C = I_{EE} \tanh\left(\frac{Vin}{2V_T}\right) \qquad \text{Equation 4}$$

Taking the differentiation of Equation 4 with respect to Vin yields the dynamic conductance of the limiter 422 represented as follows:

$$g_m = \left(\frac{I_{EE}}{2V_T}\right)\text{sech}^2\left(\frac{Vin}{2V_T}\right) \qquad \text{Equation 5}$$

As discussed above, the large signal $V \sin(\omega t)$ has excursions of gm around Vin=0. The limiter 422 large signal gain is found by arriving at an average gm (gmav) over a period of the input waveform. This large gain may be represented as follows:

$$Glarge = gmavR_L = \left(\frac{I_{EE}R_L}{2V_T 2\pi}\right)\int_0^{2\pi} \text{sech}^2\left[\frac{V\sin\theta}{2V_T}\right] d\theta \qquad \text{Equation 6}$$

where $R_L$=R1=R2. Thus, the large signal gain is gmavRL.

The small signal gain is obtained by evaluating gm function at the large signal amplitude V, as the small signal excursion are on the envelope. Accordingly, the small signal gain may be represented as follows:

$$Gss = R_L\left(\frac{I_{EE}}{2V_T}\right)\text{sech}^2\left(\frac{V}{2V_T}\right) \qquad \text{Equation 7}$$

The isolation, which is a function of the ratio of the large signal gain over the small signal gain, may be represented as follows:

$$\text{Iso} = 20\log_{10}\left(\frac{Glarge}{Gss}\right) \qquad \text{Equation 8}$$

An isolation of greater than 50 dB can be achieved with an input voltage Vin greater than five (5) times the threshold voltage of the transistors Q1 and Q2.

Figure 5:
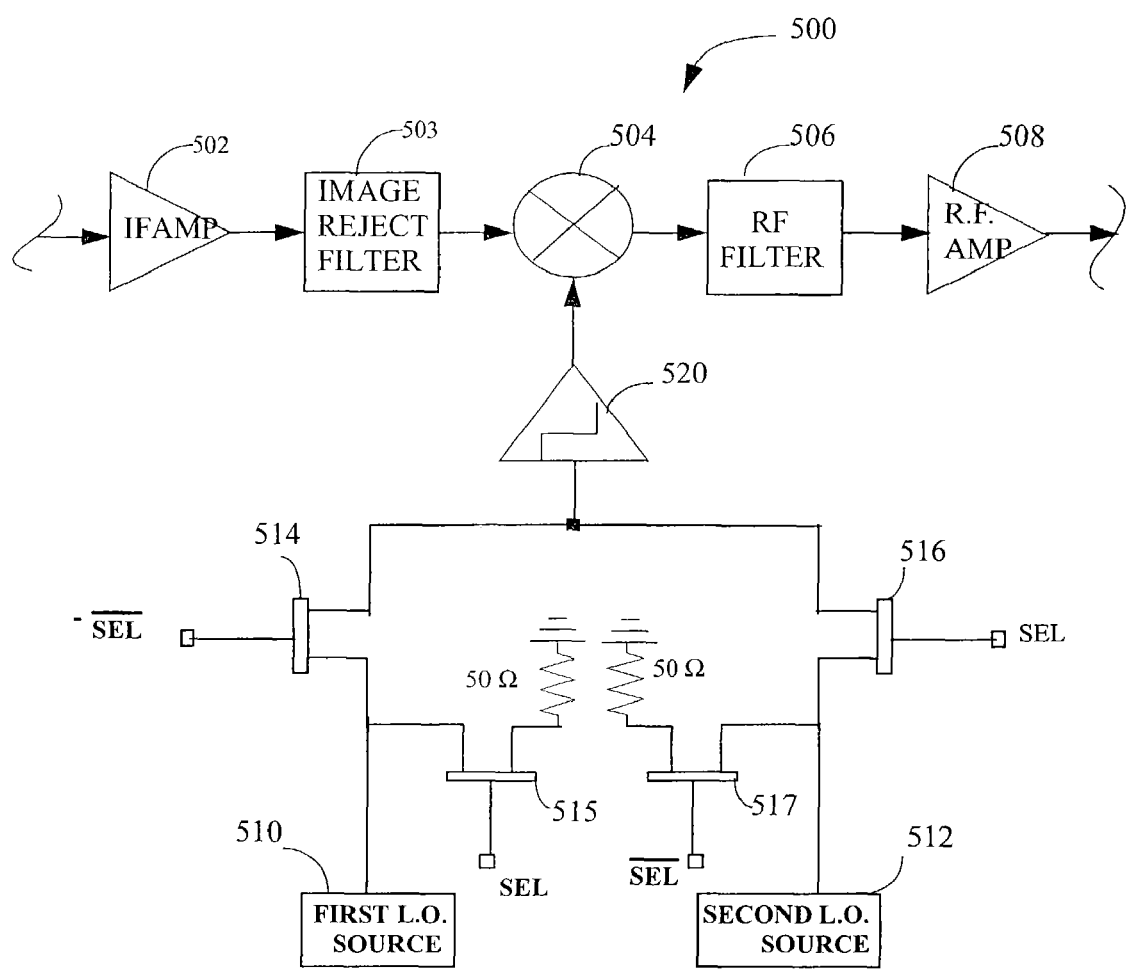
FIG. 5 illustrates a block diagram of an exemplary frequency-hopping transmitter in accordance with another embodiment of the invention.

FIG. 5 illustrates a block diagram of an exemplary frequency-hopping transmitter 500 in accordance with another embodiment of the invention. The novel LO circuit discussed above with reference to the receiver 200 may also be incorporated into the frequency-hopping transmitter 500. The transmitter 500 comprises an IF amplifier 502 to amplify an IF signal, an image reject filter 503 to reject the image signal, a mixer 504 to up convert the IF signal into an RF signal, an RF filter 506 to reject undesired signals generated by the mixer 504, and an RF power amplifier 508 to amplify the RF signal. In addition, the transmitter 500 comprises an LO circuit including a first LO source 510 to generate a first periodic signal cycling at a first frequency, a second LO source 512 to generate a second periodic signal cycling at a second frequency different than the first frequency, a first set of switching elements 514–515 (e.g. FETs) to selectively couple and de-couple the first LO source 510 to and from the mixer 504, a second set of switching elements 516–517 (e.g. FETs) to selectively de-couple and couple the second LO source 512 from and to the mixer 504. The LO circuit further includes 50-ohm loads to provide a load for the unselected LO source. The LO circuit further comprises a limiter 520 to provide further isolation of the leakage LO signal with respect to the selected LO signal, as discussed above.

Figure 6:
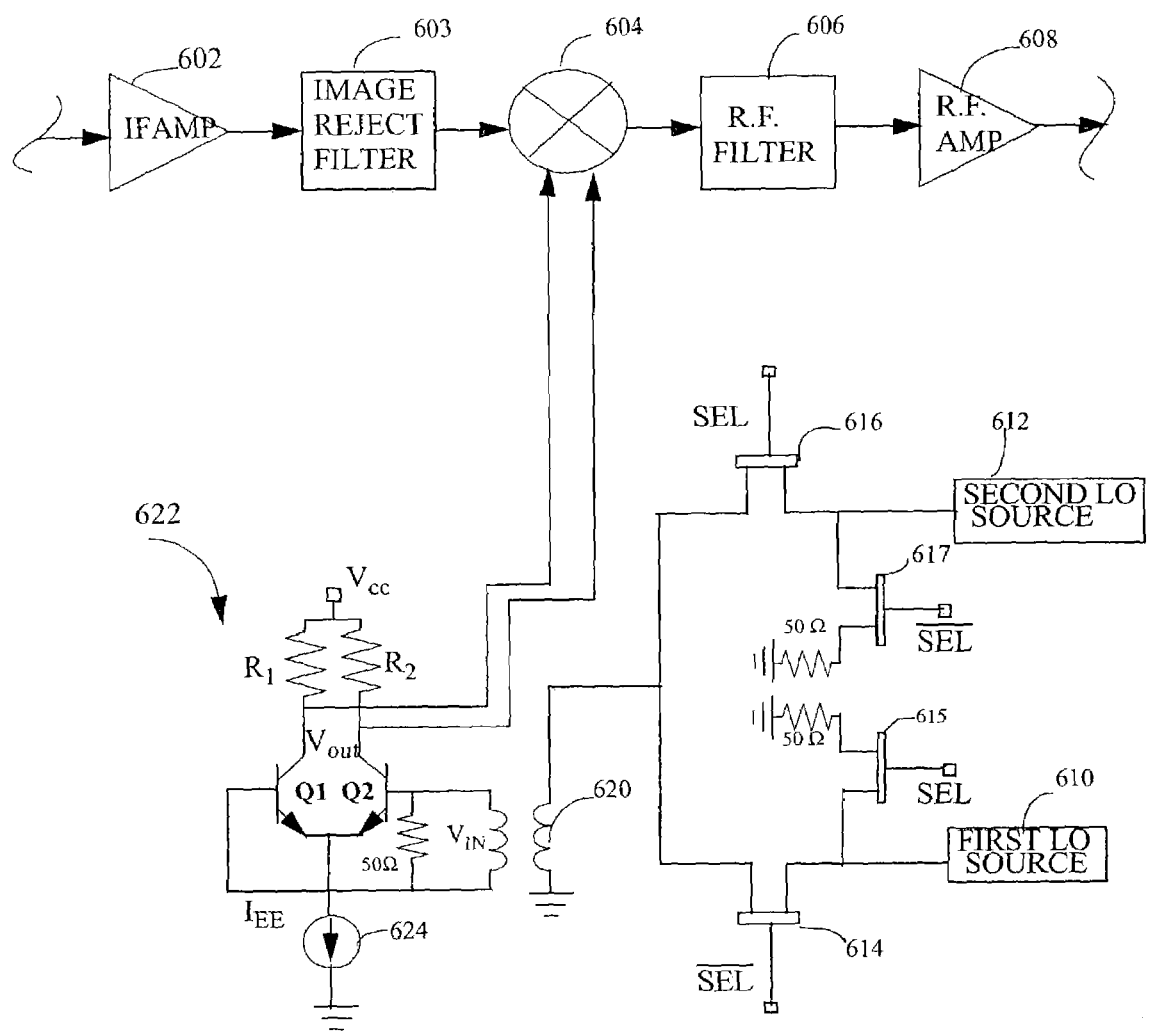
FIG. 6 illustrates a block diagram of another exemplary frequency-hopping transmitter in accordance with another embodiment of the invention.

FIG. 6 illustrates a block diagram of another exemplary frequency-hopping transmitter 600 in accordance with another embodiment of the invention. The novel LO circuit discussed above with reference to the receiver 400 may also be incorporated into the frequency-hopping transmitter 600. The transmitter 600 comprises an IF amplifier 602 to amplify an IF signal, an image reject filter 603 to reject the image signal, a mixer 604 to up convert the IF signal into an RF signal, an RF filter 606 to reject undesired signals generated by the mixer 604, and an RF power amplifier 608 to amplify the RF signal. In addition, the transmitter 600 comprises an LO circuit including a first LO source 610 to generate a first periodic signal cycling at a first frequency, a second LO source 612 to generate a second periodic signal cycling at a second frequency different than the first frequency, a first set of switching elements 614–615 (e.g. FETs) to selectively couple and de-couple the first LO source 610 to and from the mixer 604, a second set of switching elements 616–617 (e.g. FETs) to selectively de-couple and couple the second LO source 612 from and to the mixer 604. The LO circuit further includes 50-ohm loads to provide a load for the unselected LO source.

The LO circuit further comprises a transformer 620, coupled to both switching elements 614 and 616, to convert the LO signal into a differential LO signal. In addition, the LO circuit comprises a limiter 622 including a differential pair of transistors Q1 and Q2 (e.g. bipolar transistors), a pair of resistive elements R1 and R2 coupled between the respective collectors of the transistors Q1 and Q2 and a power supply Vcc, and a current source 624 coupled between the emitters of the transistors Q1 and Q2 and ground. A 50-ohm resistive element is coupled across the secondary winding of the transformer 620. The differential outputs of the limiter 622 are taken off the respective collectors of the transistors Q1 and Q2. The differential ouptuts of the limiter 622 may be applied to the mixer 604 if it accepts differential LO inputs, or may be converted back to a single-ended output with the use of another transformer (not shown). The limiter 622 provides higher gain for the selected LO signal than for the leakage LO signal, thereby further improving the isolation of the leakage LO signal from the mixer 604.

The frequency-hopping receivers and transmitters described herein are merely examples, and could vary substantially from a hardware standpoint depending on the applications and requirements of the receivers and transmitters. For instance, single-ended or balanced mixers can be used in connection with the novel LO to down convert or up convert the desired signal. Additional amplification stages for the RF and/or IF signal may be provided. Additional filters for filtering the RF and/or the IF signal may also be provided. Other hardware that perform power monitoring, control, and other function may also be provided.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

It is claimed:

1. A receiver comprising:
 a mixer to down convert a received RF signal; and
 a local oscillator (LO) circuit coupled to said mixer, wherein said LO circuit comprises:
  a first LO source to generate a first periodic signal cycling at a first frequency;
  a second LO source to generate a second periodic signal cycling at a second frequency different than said first frequency;
  an amplifier having an input, an output coupled to the mixer, and a gain variable with the amplitude of a signal applied to the amplifier;
  a first switching element to selectively couple said first periodic signal to said amplifier input when said first switching element is turned on; and
  a second switching element to selectively couple said second periodic signal to said amplifier input when said second switching element is turned on;
  said first and second switching elements allowing leakage of said first and second periodic signals, respectively, to said amplifier input when said first and second switching elements are off, respectively;
  the amplifier responding to a signal comprising said first periodic signal and leakage of said second periodic signal by providing a greater gain to said first periodic signal than to said leakage of said second periodic signal, and responding to a signal comprising said second periodic signal and leakage of said first periodic signal by providing a greater gain to said second periodic signal than to said leakage of said first periodic signal.

2. The receiver of claim 1 wherein the gain of said amplifier decreases with signal amplitude.

3. The receiver of claim 2 wherein the amplifier comprises a differential transistor pair having a predetermined tail current.

4. The receiver of claim 3 wherein the transistor pair is a bipolar transistor pair.

5. The receiver of claim 4 wherein the differential transistor pair has resistive loads thereon.

6. The receiver of claim 3 further comprising a transformer having a primary winding coupled to the first and second switching elements and a secondary winding coupled to control terminals of the transistor pair.

7. The receiver of claim 1 wherein the amplifier is a differential amplifier and further comprising a transformer having a primary winding coupled to the first and second switching elements and a secondary winding coupled to input terminals of the differential amplifier.

8. The receiver of claim 1 wherein the receiver is a frequency hopping receiver.

9. A radio comprising:
 a mixer to convert the frequency of a signal; and
 a local oscillator (LO) circuit coupled to said mixer, wherein said LO circuit comprises:
  a first LO source to generate a first periodic signal cycling at a first frequency;
  a second LO source to generate a second periodic signal cycling at a second frequency different than said first frequency;
  an amplifier having an input, an output coupled to the mixer, and a gain variable with the amplitude of a signal applied to the amplifier;
  a first switching element to selectively couple said first periodic signal to said amplifier input when said first switching element is turned on; and
  a second switching element to selectively couple said second periodic signal to said amplifier input when said second switching element is turned on;
  said first and second switching elements allowing leakage of said first and second periodic signals, respectively, to said amplifier input when said first and second switching elements are off, respectively;
  the amplifier responding to a signal comprising said first periodic signal and leakage of said second periodic signal by providing a greater gain to said first periodic signal than to said leakage of said second periodic signal, and responding to a signal comprising said second periodic signal and leakage of said first periodic signal by providing a greater gain to said second periodic signal than to said leakage of said first periodic signal.

10. The radio of claim 9 wherein the radio is a transmitter.

11. The radio of clam 10 wherein the transmitter is a frequency hopping transmitter.

12. The radio of claim 9 wherein the mixer is coupled to up convert the frequency of the signal.

13. The radio of claim 9 wherein the mixer coupled to down convert the frequency of the signal.

14. The radio of claim 9 wherein the gain of said amplifier decreases with signal amplitude.

15. The receiver of claim 14 wherein the amplifier comprises a differential transistor pair having a predetermined tail current.

16. The receiver of claim 15 wherein the transistor pair is a bipolar transistor pair.

17. The receiver of claim 16 wherein the differential transistor pair has resistive loads thereon.

18. The receiver of claim 15 further comprising a transformer having a primary winding coupled to the first and second switching elements and a secondary winding coupled to control terminals of the transistor pair.

19. The receiver of claim 9 wherein the amplifier is a differential amplifier and further comprising a transformer having a primary winding coupled to the first and second switching elements and a secondary winding coupled to input terminals of the differential amplifier.

\* \* \* \* \*